United States Patent
Emery

(10) Patent No.: US 7,135,639 B2
(45) Date of Patent: Nov. 14, 2006

(54) INTEGRAL SLIP LAYER FOR INSULATING TAPE

(75) Inventor: F. Tim Emery, Fort Payne, AL (US)

(73) Assignee: Siemens Power Generation, Inc., Orlando, FL (US)

(*) Notice: Subject to any disclaimer, the term of this patent is extended or adjusted under 35 U.S.C. 154(b) by 396 days.

(21) Appl. No.: 10/656,054

(22) Filed: Sep. 5, 2003

(65) Prior Publication Data
US 2005/0054250 A1   Mar. 10, 2005

(51) Int. Cl.
H01B 7/34 (2006.01)
H01B 7/00 (2006.01)

(52) U.S. Cl. ............... 174/36; 174/110 R; 174/120 R; 174/121 R

(58) Field of Classification Search ............ 174/110 R, 174/110 N, 110 SR, 120 R, 120 SR, 127, 174/126.1–126.4, 36; 428/379, 372, 375
See application file for complete search history.

(56) References Cited

U.S. PATENT DOCUMENTS

| | | | | |
|---|---|---|---|---|
| 3,028,266 A | * | 4/1962 | Larsh | 427/104 |
| 3,183,142 A | * | 5/1965 | Tierney | 428/109 |
| 3,470,045 A | * | 9/1969 | Jostein et al. | 156/53 |
| 3,488,537 A | * | 1/1970 | Beddows | 310/179 |
| 4,160,926 A | * | 7/1979 | Cope et al. | 310/215 |
| 4,760,296 A | * | 7/1988 | Johnston et al. | 310/45 |
| 5,061,554 A | * | 10/1991 | Hjortsberg et al. | 428/220 |
| 6,190,775 B1 | | 2/2001 | Smith et al. | |
| 6,194,665 B1 | * | 2/2001 | Kuribayashi et al. | 174/120 R |
| 6,238,790 B1 | * | 5/2001 | Smith et al. | 428/379 |
| 2002/0046875 A1 | * | 4/2002 | Baumann et al. | 174/137 R |

* cited by examiner

Primary Examiner—William H. Mayo, III

(57) ABSTRACT

A non-stick material coated glass slip layer for use in insulating tapes for electrical conductors. A conductive glass tape is interwoven with a non-stick material coated glass tape to form the slip layer. The slip layer is sandwiched between and inner conductive layer that is in contact with and electrical conductor, and an cater conductive layer that is in contact with machinery, such as a generator. The slip layer allows for a difference of movement between the inner conductive layer and the outer conductive layer without damage to the insulating tape.

19 Claims, 3 Drawing Sheets

INTEGRAL SLIP LAYER FOR INSULATING TAPE

BACKGROUND

With the use of any form of electrical appliance, there is a need to electrically insulate conductors. Conductors need to be wrapped in a insulating tape to prevent electric discharge. An example of this is shown in FIG. 1. Illustrated here is a coil 13, comprising a plurality of turns of conductors 14. Each turn of the conductor 14 consists essentially of a copper bar or wire wrapped with a turn insulation 15. The turn insulation 15 is prepared preferably from a fibrous sheet or strip which is typically impregnated with a resin. The turn insulation 15 may be not adequate alone to withstand the severe voltage gradients that will be present between the conductor and ground when the coil is installed in a high-voltage generator. Therefore, ground insulation for the coil is provided by wrapping one or more layers of composite mica tape 16 about the turn 14.

Such a mica-tape 16 comprises a pliable backing sheet 18 of, for example, poly-ethylene glycol terephthalate or glass fabric mat, having a layer of mica flakes 20 bonded to a resin. The tape 16 may be applied half lapped, abutted or in any other suitable manner. Generally, multiple layers of the mica tape 16 are wrapped about the coil with sixteen or more layers generally being used for high voltage coils. The number of layers may be decreased depending on the power of the generator and the effectiveness of the insulator in both its abilities to insulate electrically and conduct heat. To impart better abrasion resistance and to secure a tighter insulation, a wrapping of an outer tape 21 of a tough fibrous material, for example, glass fiber, asbestos or the like may be applied to the coil.

Therefore, what is referred to as insulating tape is actually composed of multiple layers of tape that have different properties. The inner most layer is referred to as the groundwall insulation. Wrapped around this is the conductive layer. The conductive layer provides a low resistance and doesn't allow voltage to be present between the outer coil surface and the core. As will be discussed below, in order to function properly as a conducting electrode, the conductive layer needs to be in firm contact with both the groundwall insulation and the generator assembly in which the wrapped conductor (coil) is inserted.

As mentioned, the insulating tape is generally impregnated with a resin to improve many of its overall properties. There are many methods of coating materials with epoxy resins and then curing the product. One such method is vacuum pressure impregnation (VPI). This method is used on devices such as stator conductor coils. A mica/glass insulating tape is applied to the coils, then the coils are placed in a vacuum vessel and a vacuum is applied. After a period of time, resin is admitted to impregnate the coils. Pressure is applied to force the resin in and minimize voids, which will affect conductivity. After this is completed, the coils are heated to cure the resin. The resin may contain an accelerator or the tape may have one in it. A variation of this, global VPI involves the process where dry insulated coils are wound, and the then whole stator is vacuum pressure impregnated rather than the individual coils.

The wrapped conductor is then placed into machinery such as a generator. FIG. 2 shows one embodiment of a generator in cross section. The generator comprises a metal armature or rotor 28 having slots 22 therein, containing insulated coils 23, surrounded by a metal stator 24 having slots 25 therein about the stator circumference at 26. The stator slots contain insulated coils 27.

If the conductor is not secure against the generator assembly, electric discharge will result. This adversely affects the performance of the machinery, and also causes cumulative damage to the generator, conductor and insulation tape.

In order to prevent such a discharge, the conductive layer of the insulating tape itself needs to be made of at least two layers, which are referred to as the outer conductive layer and the inner conductive layer. Note that both of these sub layers may themselves be composed of multiple layer depending on need. The outer layer of conductive tape will be in firm contact with the generator assembly, while the inner conductive layer will be in firm contact with the groundwall insulation. This, however, creates a problem, since the conductor and the generator assembly often have minor movements independent of one another due to such things as heating and vibration. This is referred to as a difference of movement. If the outer conductive layer of the insulating tape is in firm contact with the generator assembly, and the conductor moves independently of the assembly, stresses are created on the insulating tape.

These stresses cause the tape to tear, ruining the insulation around the conductor coil. To prevent this, machinery is run at below desired level to prevent movements due to vibration and temperature.

An alternate solution is to provide a slip layer in the insulating tape. This slip layer is sandwiched between an inner conductive layer, which is in contact with the conductor, and the outer conductive layer, which is in contact with the generator assembly. The slip layer consists of a mica-filled tape that is interwoven with a conductive tape, as shown in FIG. 3. The mica-filled slip layer consist primarily of large mica flakes, generally larger than those used in other insulating layers. Therefore they are not well bonded together and can slip relative to each other. A conductor 13 is wrapped with a groundwall insulation layer 43 and then a inner conductive layer 44 followed by a mica-filled tape 41 that has a conductive interweave 42 woven horizontally along one side. This slip layer allows for a minor difference of movement between the inner 44 and outer 46 conductive layers, without causing any tears or damage to the tape.

This solution, however, is not with out its own problems. One concern is that the slip layer, because of being a mica-filled tape, is extremely delicate. This means that the slip layer, and often the entire insulating layer, has to be wound around the conductor by hand, rather than using more efficient machinery. Because the mica-filled tape has large flakes, it is delicate and there for is more susceptible to handling damage. Also, the amount of slip that the slip layer allows for is only moderate. Therefore the difference of movement between the conductor and generator assembly cannot be too significant. Further, the mica-filled tape is on average 11.5 mils thick (0.3 mm). Since the assembly needs to produce an overlap of the tape, this increases the overall insulating tape thickness to 25 mils (0.65 mm) per side of the conductor coil. This added thickness not only adds to the overall size of related machinery, but also reduces efficiency in properties such as thermal conductivity.

The mica-filled tape, however, has not been able to be replaced because of the nature of the mica-flakes. They provide the needed dielectric strength. They are also porous to the resins used in impregnating the insulating tape. Without proper porosity, the inner conductive layer will not saturate properly, thus ruining the properties of the insulating tape.

What is needed is a slip layer that is thinner, more resilient and that allows a greater slip tolerance, while maintaining or improving upon the dielectric properties and porosity of the prior art.

SUMMARY OF THE INVENTION

The present invention provides for a non-stick material coated glass slip layer for use in insulating tapes for electrical conductors. A conductive glass tape is interwoven with a non-stick material coated glass tape to form the slip layer of the present invention. The slip layer is sandwiched between and inner conductive layer that is in contact with an electrical conductor, and an outer conductive layer that is in contact with machinery, such as a generator. The slip layer allows for a difference of movement between the inner conductive layer and the outer conductive layer without damage to the insulating tape.

In one embodiment the slip layer is between 2–6 mils (0.05–0.15 mm) thick without overlap.

In a particular embodiment the insulating tapes are impregnated with a resin after being wound around the electrical conductor.

In one embodiment the ratio of the conductive interweave to the slip layer is between 1:1 and 1:8 by surface area.

In another embodiment, the conductive interweave has a resistance of approximately 200 ohms per square.

In a particular embodiment the slip layer and the conductive interweave are machine wound around the electrical conductor.

In a further particular embodiment the difference of movement is up to about 0.5 inches (13 mm).

DETAILED DESCRIPTION OF THE INVENTION

Figure 1:
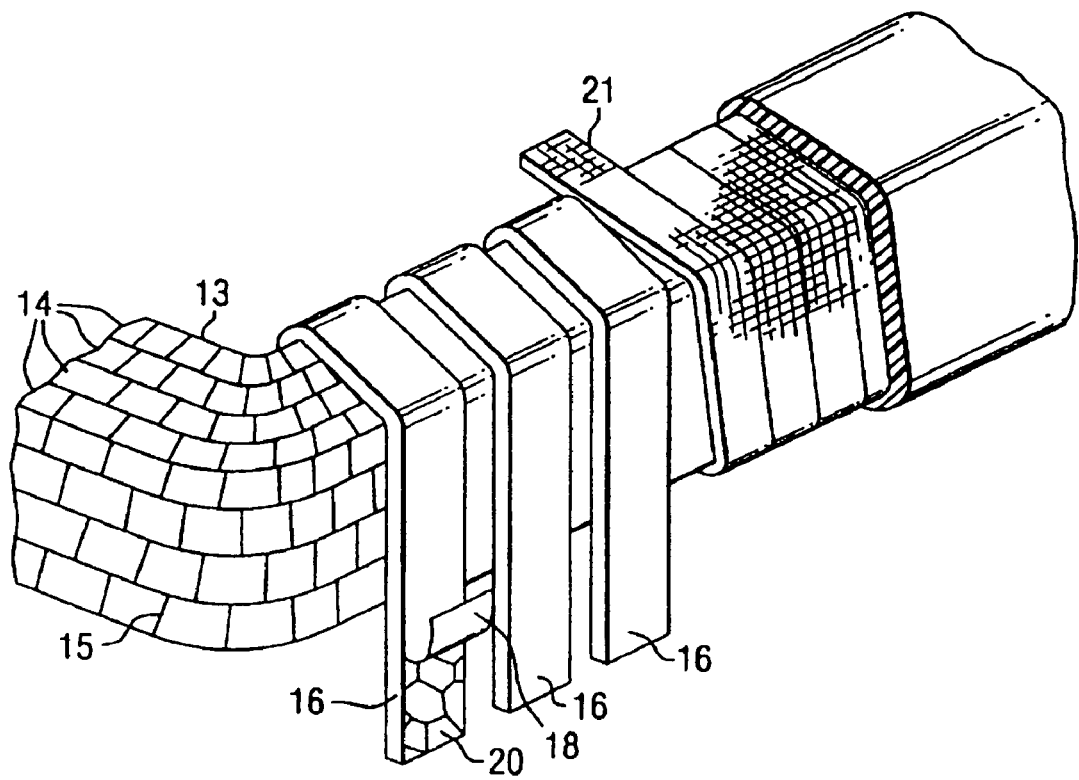
FIG. 1 illustrates insulative wrappings around a conductor.
Figure 2:
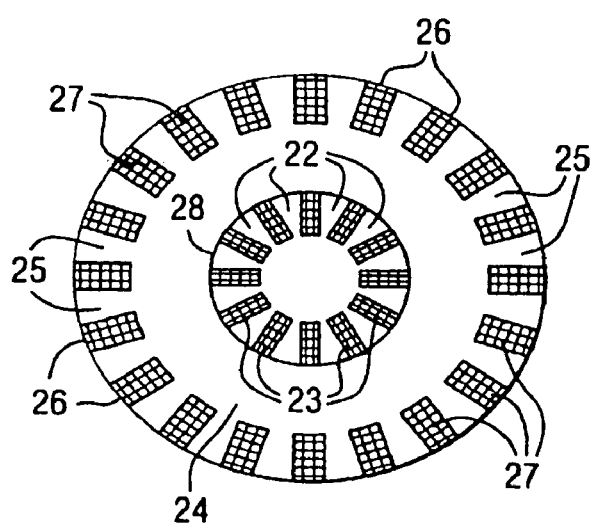
FIG. 2 shows a cross sectional view of a generator where insulated conductors are used.
Figure 3:
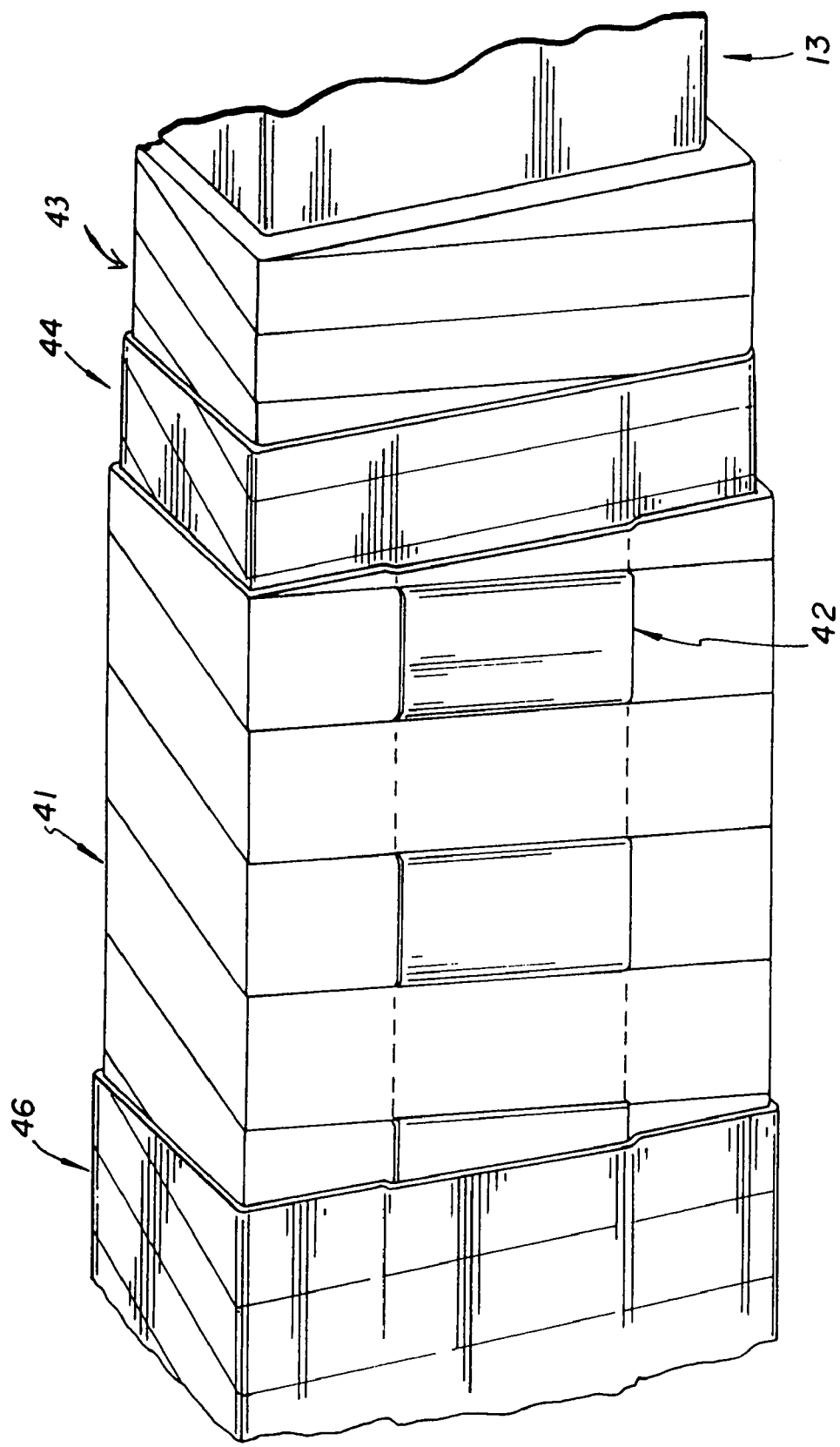
FIG. 3 shows a mica-tape slip layer of the prior art.

In one embodiment, the present invention provides insulating tapes for insulating an electrical conductor. The tapes comprise a groundwall layer, an inner conductive layer, an outer conductive layer, and a slip layer located between the two conductive layers. The slip layer itself comprises non-stick material coated porous glass tape. The slip layer allows for a difference of movement between the inner conductive layer and the outer conductive layer without damage to the insulating tape. Interwoven with the slip layers is a conductive interweave. The slip layer is wrapped around the electrical conductor in an overlapping manner that allows the conductive interweave to maintain contact between the inner conductive layer and the outer conductive layer. Also, the porosity of the slip layer is sufficient to allow an impregnation of a resin through the slip layer to the inner conductive layer As used herein, the term non-stick material refers to all non-stick materials that may be coated on a glass surface in accordance with the present invention. Example of this include, but are not limited to, tetrafluroethylene (TFE and PTFE), which is also referred to as Teflon®, chlorotrifluroethylene (CTFE), polyvinylidene fluoride (PVF$_2$), perfluroalkoxy (PFA), polyethylene, unplasticized polyvinyl chlorides (Saran), and acrylonitrile butadiene styrene (ABS).

In one embodiment the slip layer is between 2–6 mils (0.05–0.15 mm) without overlap. This refers to the general thickness of the non-stick material coated glass tape itself. Once wrapped around the electrical conductor, the slip layer will generally overlap with itself or the interwoven conductive layer. In a particular embodiment the slip layer and the conductive interweave are wound around the electrical conductor in a half lap manner. Depending on the orientation of how the slip layer is wound, this may produce a vertical striping pattern somewhat perpendicular to the axis of the electrical conductor.

In a particular embodiment the insulating tapes are impregnated with a resin after being wound around the electrical conductor.

In one embodiment the ratio of the conductive interweave to the slip layer is between 1:1 and 1:8 by surface area. In another particular embodiment the ratio of the conductive interweave to the slip layer is between 1:2 and 1:4 by surface area.

In a further embodiment, the slip layer is approximately 1.18 inches (30 mm) wide, an in a related embodiment, the conductive interweave is approximately 0.59 inches (15 mm) wide.

In another embodiment, the conductive interweave has a resistance of between 10 and 10,000 ohms per square. In a particular embodiment the resistance is approximately 200 ohms per square.

In a particular embodiment the slip layer and the conductive interweave are machine wound around the electrical conductor. This is a great improvement over the prior art, where the slip layer is hand wound around the electrical conductor.

In a further particular embodiment the difference of movement is up to about 0.5 inches (13 mm). This is the approximate maximum movement that a conductor is likely to move in relation to an abutted machine assembly. Other applications may require a greater difference of movement, to which the present invention is equally suited to achieve.

In still another particular embodiment the insulating tape maintains physical properties at temperatures of 155° C.

In another embodiment, the present invention provides for a slip layer with conductive interweave for use in insulating tape on electrical conductors that comprises non-stick material coated porous glass tape and glass conductive tape. The non-stick material tape and the conductive tape are interwoven in a manner such that the conductive tape transverses the slip layer such that the conductive tape is exposed on both sides of the slip layer. The ratio of the conductive tape to the non-stick material glass tape from 1:1 to 1:8 by surface area of the slip layer, and the porosity of the non-stick material tape is sufficient to allow an impregnation of a resin through the slip layer.

In still another embodiment, the present invention provides for a method for manufacturing an insulating tape with an integral slip layer for wrapping of an electrical conductor. This method comprises wrapping an inner conductive layer of glass tape around the electrical conductor and then wrapping non-stick material coated porous glass tape interwoven with a conductive interweave glass tape around the electrical conductor over the inner conductive layer, wherein the slip layer is formed. Then wrapping an outer conductive layer of glass tape round the electrical conductor over the slip layer. To this, a resin is impregnated all the way to the inner conductive layer through the non-stick material coated porous glass tape, and is then cured. In this method the slip layer is wrapped around the electrical conductor in an overlapping manner that allows the conductive interweave to maintain contact between the inner conductive layer and the outer conductive layer. The slip layers allows for a difference of movement between the inner conductive layer and the outer conductive layer without damage to the insulating tape.

Figure 4:
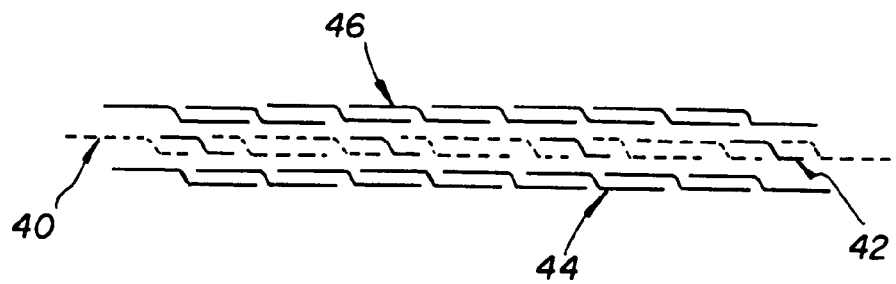
FIG. 4 illustrates one example of how the slip layer of the present invention may be wound.

In a particular embodiment the non-stick material coated porous glass tape and the conductive glass tape are machine wound on the electrical conductor FIG. 4 illustrates a simplified embodiment of the present invention. The slip layer is composed of non-stick material coated porous glass tape 40 interwoven with a conductive interweave glass tape 42. The slip layer allows a difference of movement between the inner conductive layers, which is in contact with an electrical conductor (not shown), and an outer conductive layer 46, which is in contact with machine assembly (not shown). In this figure, the various tapes and layers are shown spaced apart for clarity. In actuality, however, little or no space between the tapes and layer would be present. The type of wrapping shown in this figure exemplifies an typical half lap wrapping. Other types of wrapping will be known to one of ordinary skill in the art. In this example, the non-stick material coated porous glass tape is about twice as wide as the conductive interweave glass tape. Also, non-stick material coated porous glass tape is wound twice for every wind of the interweave glass tape. Variations in fits configuration will be appreciated by one of ordinary skill in the art. A goal in the wrapping is to maximize the amount of slip protection that the non-stick material coated tape provides, while maintaining sufficient electrical conduct between the inner and outer conductive layers through the conductive interweave. This includes allowing for environmental conditions, such as operating temperatures of 155° C.

Figure 5:
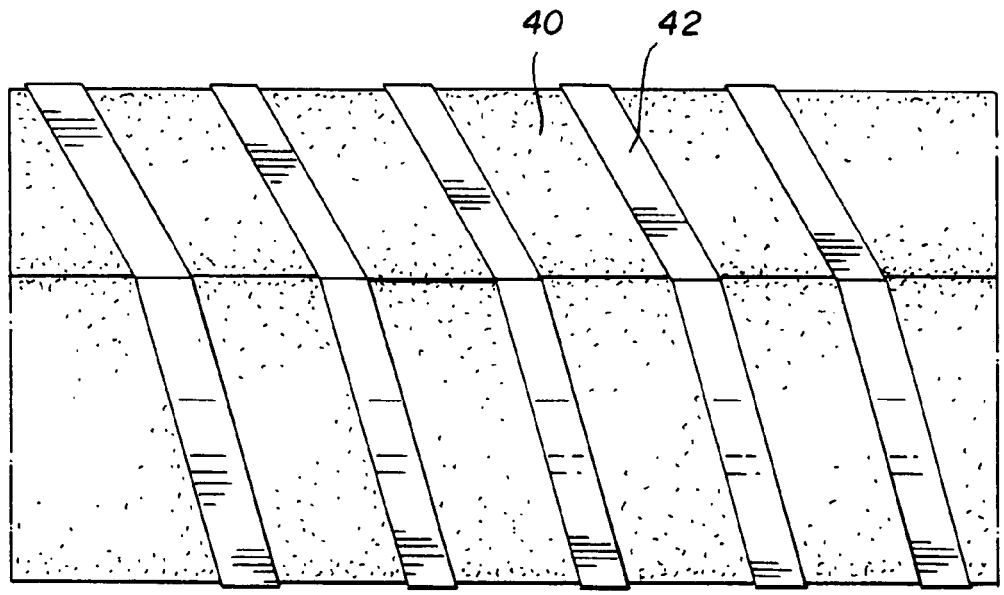
FIG. 5 illustrates an electrical conductor after being wrapped by a slip layer of the present invention.

Therefore, the amount of surface area of the slip layer that is the conductive interweave maybe anywhere from approximately 12% to 50%, with a particular embodiment being approximately 25%. FIG. 5 illustrates a slip layer wound about an electrical conductor in this manner. The half lap method produces a somewhat vertical striping of the conductive interweave 42 between the non-stick material coated glass 40. The outer conductive layer would then be added to the slip layer to complete the insulating tape.

This slip layer is sandwiched between an inner conductive layer, which is in contact with the conductor, and the outer conductive layer, which is in contact with the machinery, such as generator assembly or generator part. Both conductive layers need to be in firm contact with the conductor and the assembly respectively, otherwise efficiency will be lost and damaging discharges will occur. Since the electrical conductors heat at a different rate than the surrounding assembly, there will be movement due to expansion. Sine the conductors can be several meters long, thermal expansion will cause a difference of movement between the inner and outer conductive layers. Other factors, such as vibrations, may also contribute to the difference of movement. This difference of movement is often 0.25 inches (6.5 mm) and up to 0.5 inches (13 mm) or more. The slip layer allows for this movement without tearing, while the conductive interweave maintains electrical conduct between the two layers.

The non-stick material may be coated on the porous glass by methods known in the art, such as Teflon®spray coating.

Though particular embodiments have described the use of a single slip layer in the insulating tape, other applications may require multiple slip layers to be used. The present invention is not bound by the use of single slip layer. Multiple slip layers, either stacked or interspersed, are within the scope of the present invention.

The term glass as used herein refers to any type of glass-like fiber used in insulating tape, including such materials as poly-ethylene glycol terephthalate and asbestos. Though high thermal glass weaves are a common embodiments, the present invention may also be used with glass fleeces, and polyesters such as Dacron™.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. Insulating tapes for insulating an electrical conductor comprising:
    an inner conductive layer;
    an outer conductive layer; and
    a slip layer located between said inner conductive layer and said outer conductive layer, wherein said slip layer comprises a non-stick material coated porous glass tape, and wherein said slip layers allows for a difference of movement between said inner conductive layer and said outer conductive layer without damage to said insulating tape; and
    a conductive interweave interwoven with said slip layer;
    wherein the porosity of said slip layer is sufficient to allow an impregnation of a resin through said slip layer to said inner conductive layer;
    wherein said slip layer is wrapped around said electrical conductor in an overlapping manner that allows said conductive interweave wrapped similarly to said slip layer to maintain contact between said inner conductive layer and said outer conductive layer through the width of said conductive interweave.

2. The insulating tapes of claim 1, wherein the thickness of said slip layer is between 2–6 mils (0.05–0.15 mm) without overlap.

3. The insulating tapes of claim 1, wherein said insulating tapes are impregnated with a resin after being wound around said electrical conductor.

4. The insulating tapes of claim 1, wherein said slip layer and said conductive interweave are wound around said electrical conductor in a half lap manner.

5. The insulating tapes of claim 4, wherein said half lap manner produces a vertical striping pattern somewhat perpendicular to the axis of said electrical conductor.

6. The insulating tapes of claim 1, wherein the ratio of said conductive interweave to said slip layer is between 1:1 and 1:8 by surface area.

7. The insulating tapes of claim 1, wherein the ratio of said conductive interweave to said slip layer is between 1:2 and 1:4 by surface area.

8. The insulating tapes of claim 1, wherein said slip layer is approximately 30 mm wide.

9. The insulating tapes of claim 1 wherein said conductive interweave is approximately 0.59 inches (15 mm) wide.

10. The insulating tapes of claim 1, wherein said conductive interweave has a resistance of approximately 200 ohms per square.

11. The insulating tapes of claim 1, wherein said slip layer and said conductive interweave are machine wound around said electrical conductor.

12. The insulating tapes of claim 1, wherein said difference of movement is up to 0.5 inches (13mm).

13. The insulating tapes of claim 1, wherein said insulating tape maintains physical properties at temperatures of 155° C.

14. A slip layer with conductive interweave for use in insulating tape on electrical conductors comprising:
   a non-stick material coated porous glass tape; and
   a glass conductive tape;
   wherein said non-stick material tape and said conductive tape are interwoven in a similar manner such that said the width of the conductive tape transverses said slip layer such that said conductive tape is exposed on both sides of said slip layer;
   wherein the ratio of said conductive tape to said non-stick material glass tape from 1:1 to 1:8 by surface area of said slip layer;
   wherein the porosity of said a non-stick material tape is sufficient to allow an impregnation eta resin through said slip layer.

15. The slip layer of claim 14, wherein the thickness of said non-stick material layer is between 2–6 mils without overlap.

16. The slip layer of claim 14, wherein said non-stick material layer is approximately 30 mm wide.

17. The slip layer of claim 14, wherein said conductive interweave is approximately 15 mm wide.

18. The slip layer of claim 14, wherein said conductive interweave has a resistance of approximately 200 ohms per square.

19. The slip layer of claim 14, wherein the non-stick material in said non-stick material layer is Teflon®.

* * * * *